United States Patent
Yoon et al.

(10) Patent No.: US 11,914,159 B2
(45) Date of Patent: Feb. 27, 2024

(54) ELECTRONIC DEVICE FOR VR, AR, AND MR

(71) Applicant: LG ELECTRONICS INC., Seoul (KR)

(72) Inventors: Sumin Yoon, Seoul (KR); Hoon Hur, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 17/434,213

(22) PCT Filed: Mar. 5, 2019

(86) PCT No.: PCT/KR2019/002549
§ 371 (c)(1),
(2) Date: Aug. 26, 2021

(87) PCT Pub. No.: WO2020/179946
PCT Pub. Date: Sep. 10, 2020

(65) Prior Publication Data
US 2022/0171200 A1    Jun. 2, 2022

(51) Int. Cl.
*G06F 3/01* (2006.01)
*G02B 27/01* (2006.01)

(52) U.S. Cl.
CPC ..... *G02B 27/0176* (2013.01); *G02B 27/0172* (2013.01); *G06F 3/011* (2013.01); *G02B 2027/014* (2013.01)

(58) Field of Classification Search
CPC . G06F 3/011; G02B 27/0176; G02B 27/0172; G02B 2027/014
See application file for complete search history.

(56) References Cited

U.S. PATENT DOCUMENTS

| | | | |
|---|---|---|---|
| 2010/0327028 A1 | 12/2010 | Nakabayashi et al. | |
| 2016/0147071 A1* | 5/2016 | Fujishiro | H04N 13/344 |
| | | | 359/632 |
| 2019/0220056 A1* | 7/2019 | Yan | G02B 27/0176 |

FOREIGN PATENT DOCUMENTS

| | | |
|---|---|---|
| JP | 6-315124 A | 11/1994 |
| KR | 10-2018-0113449 A | 10/2018 |

(Continued)

*Primary Examiner* — Robert J Michaud
(74) *Attorney, Agent, or Firm* — Birch, Stewart, Kolasch & Birch, LLP

(57) ABSTRACT

An electronic device is disclosed. An electronic device of the present invention may comprise: a goggle frame having at least one opening provided in the front surface thereof; a display positioned in front of the goggle frame and facing the at least one opening; a front band to which the goggle frame is fixed; a strap, one side of which is fixed to the front band and the other side of which is provided with a rack gear; and a rear band coupled to the other side of the strap on which the rack gear is provided. The rear band may include: a support; a gear which is mounted to the support, rotatable, and engaged with the rack gear; a rotor facing the gear and linked with the gear; and a dial facing the rotor and having at least a portion thereof exposed to the outside of the rear band. The rotor may include: a rotary body facing the dial; and a coupling protrusion positioned between the rotary body and the dial and protruding from the rotary body. The dial may include: a coupler facing the rotary body; and coupling teeth which are positioned between the rotary body and the coupler, protrude from the coupler, and are engaged with the coupling protrusion.

11 Claims, 19 Drawing Sheets

(56) References Cited

FOREIGN PATENT DOCUMENTS

| KR | 10-2018-0136222 A | 12/2018 |
|---|---|---|
| WO | WO 2018/074657 A1 | 4/2018 |

* cited by examiner

[fig. 1]
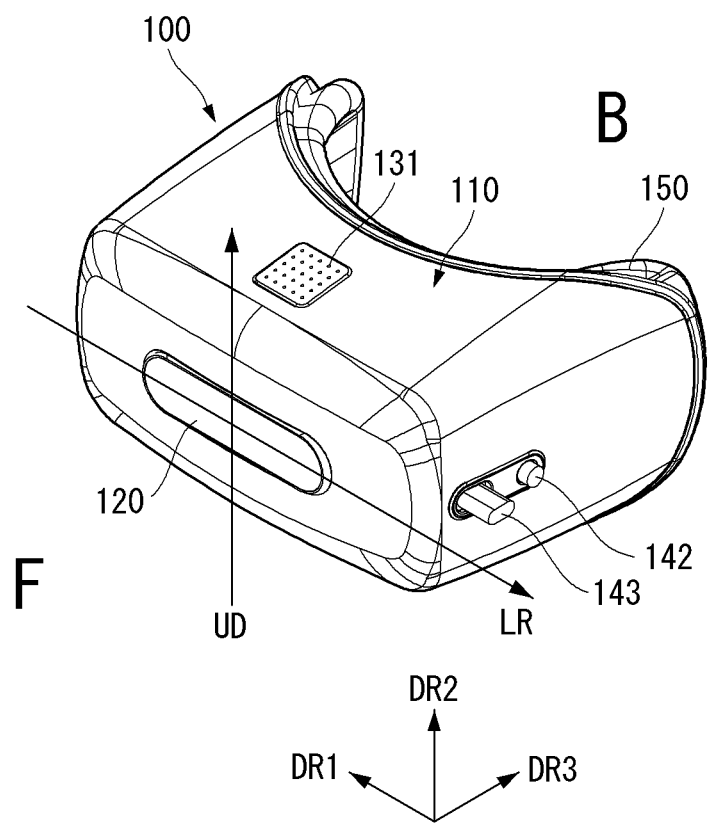

[fig. 2]
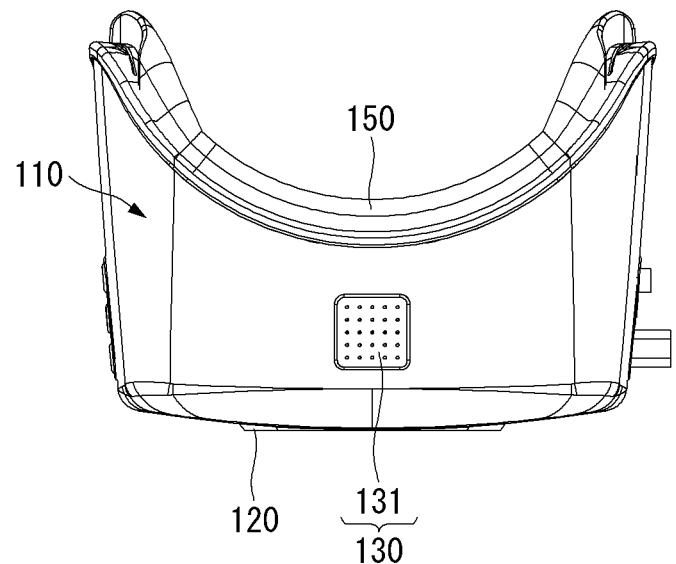

[fig. 3]
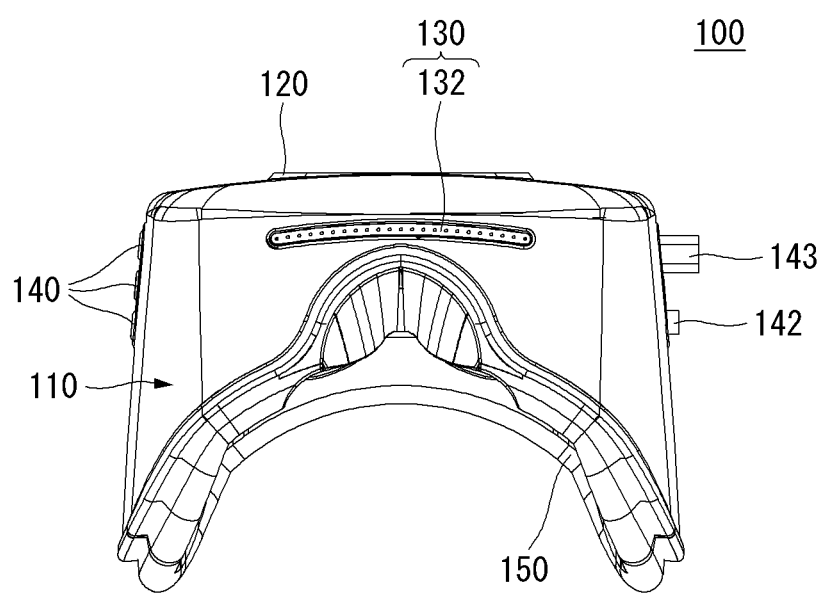

[fig. 4]
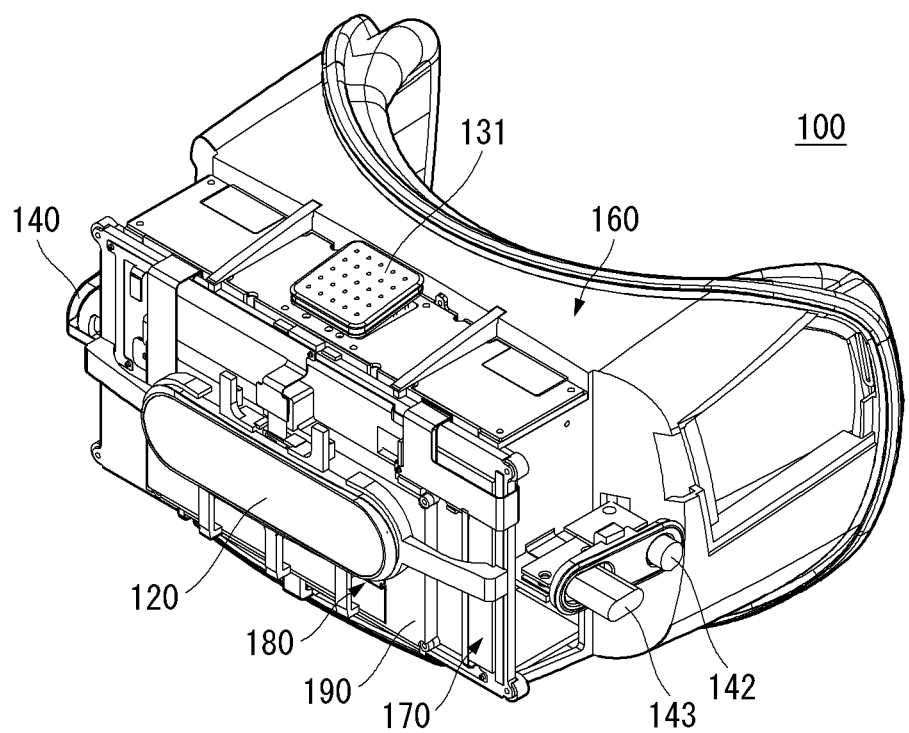

[fig. 5]
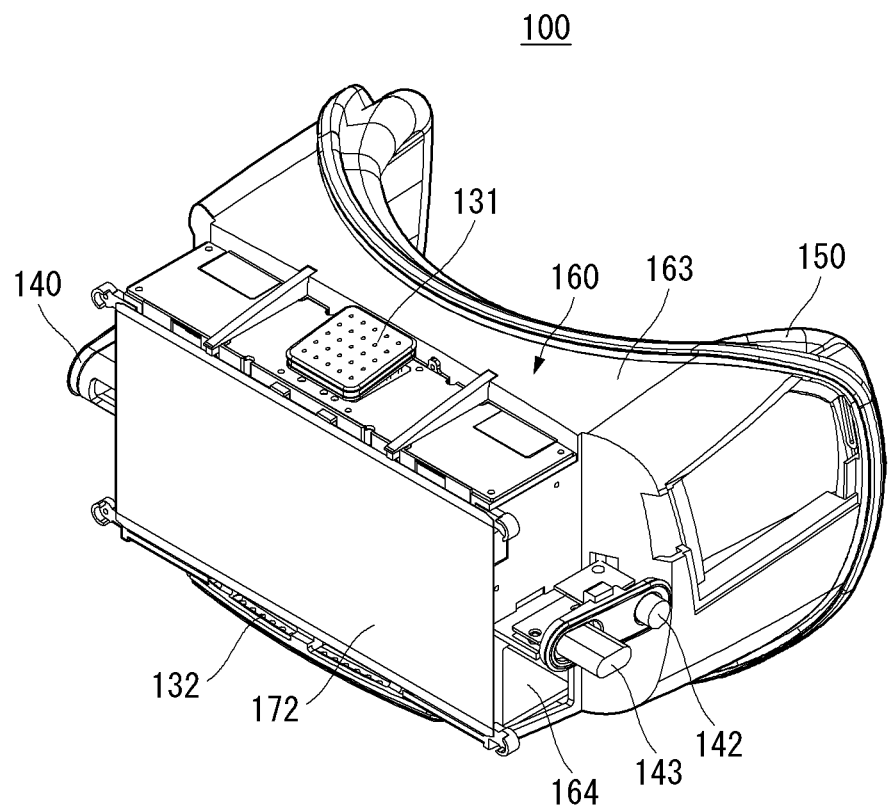

[fig. 6]
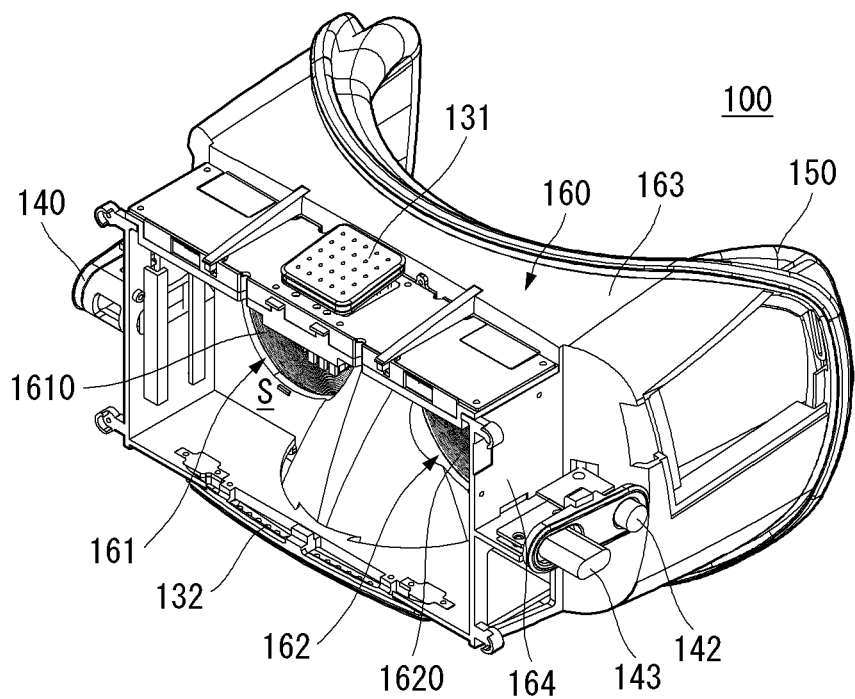

[fig. 7]
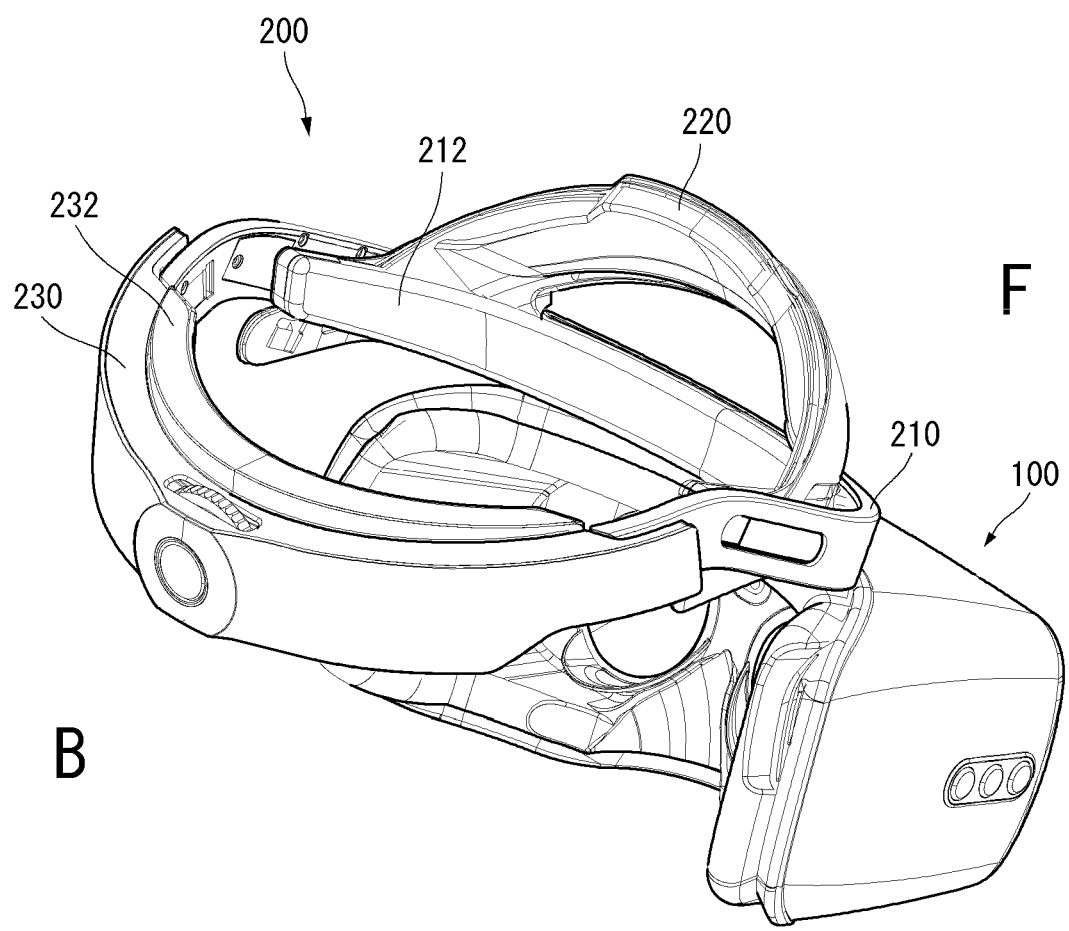

[fig. 8]
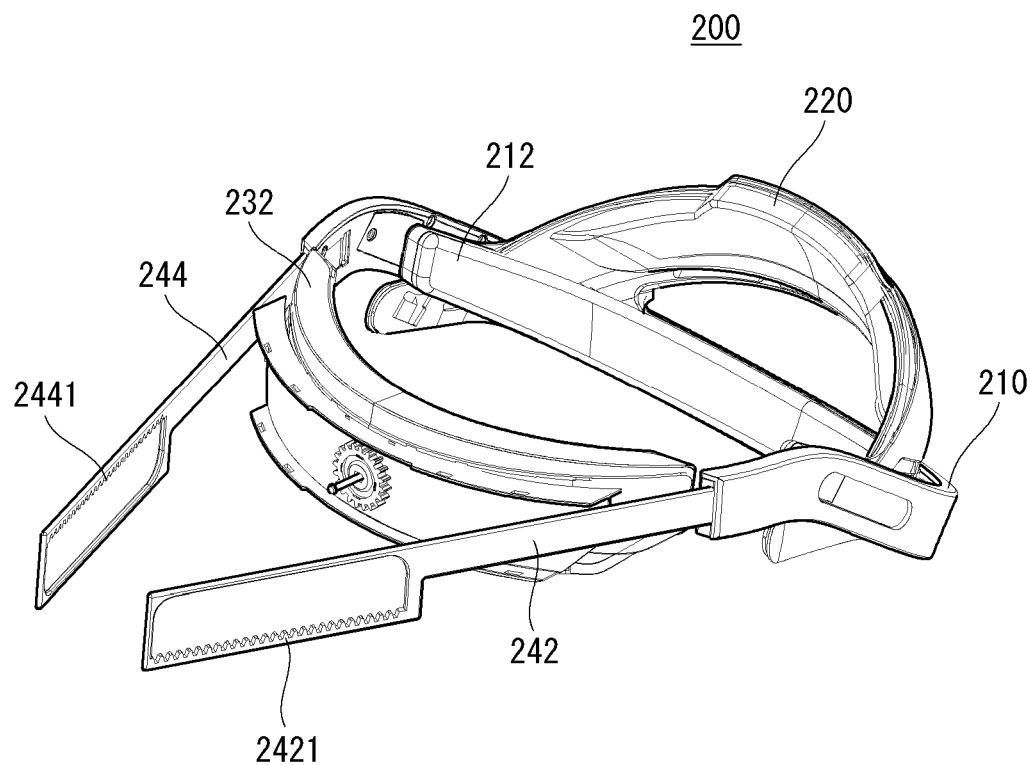

[fig.9]
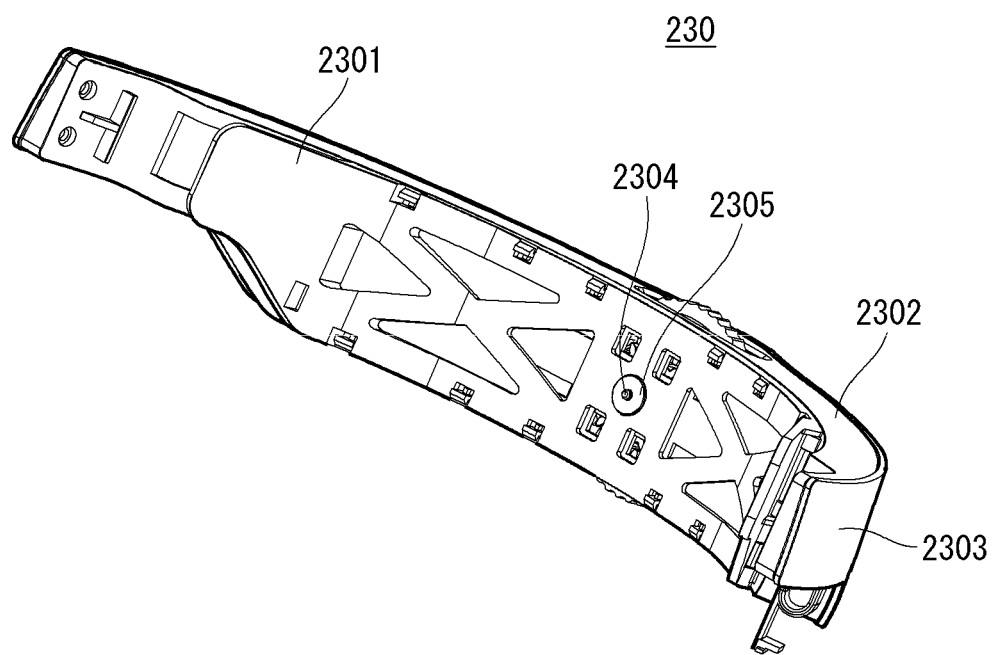

[fig.10]
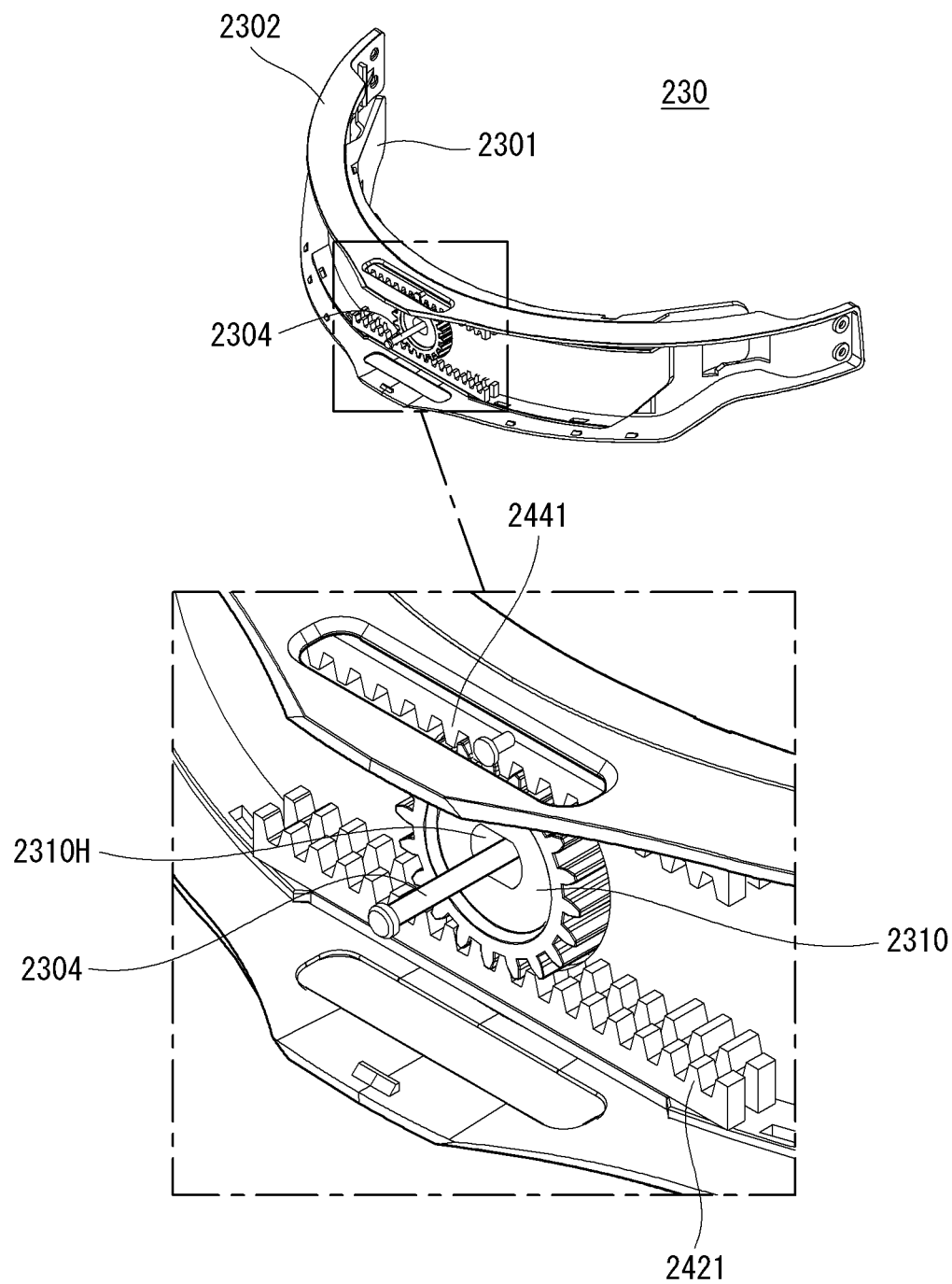

[fig.11]
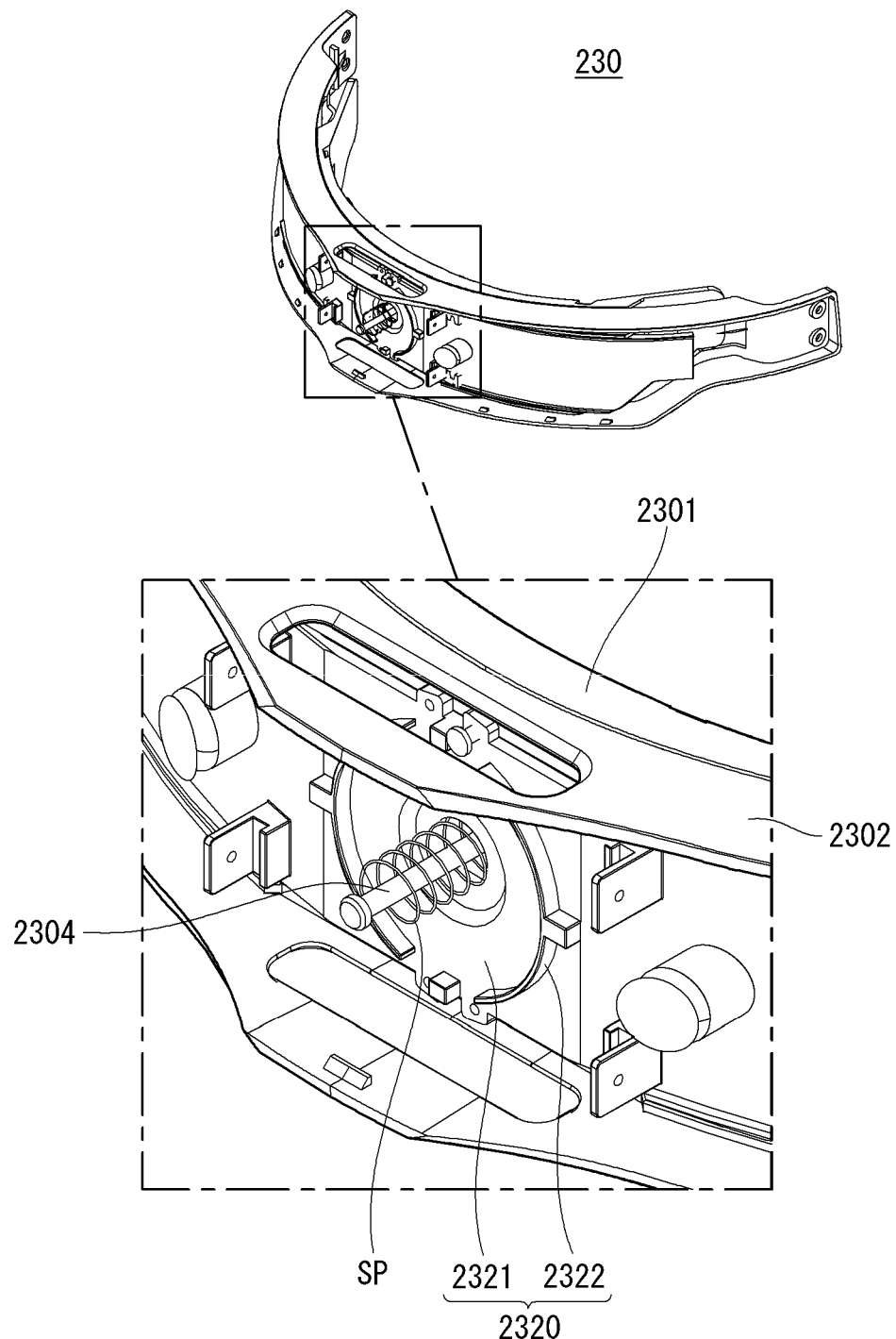

[fig.12]
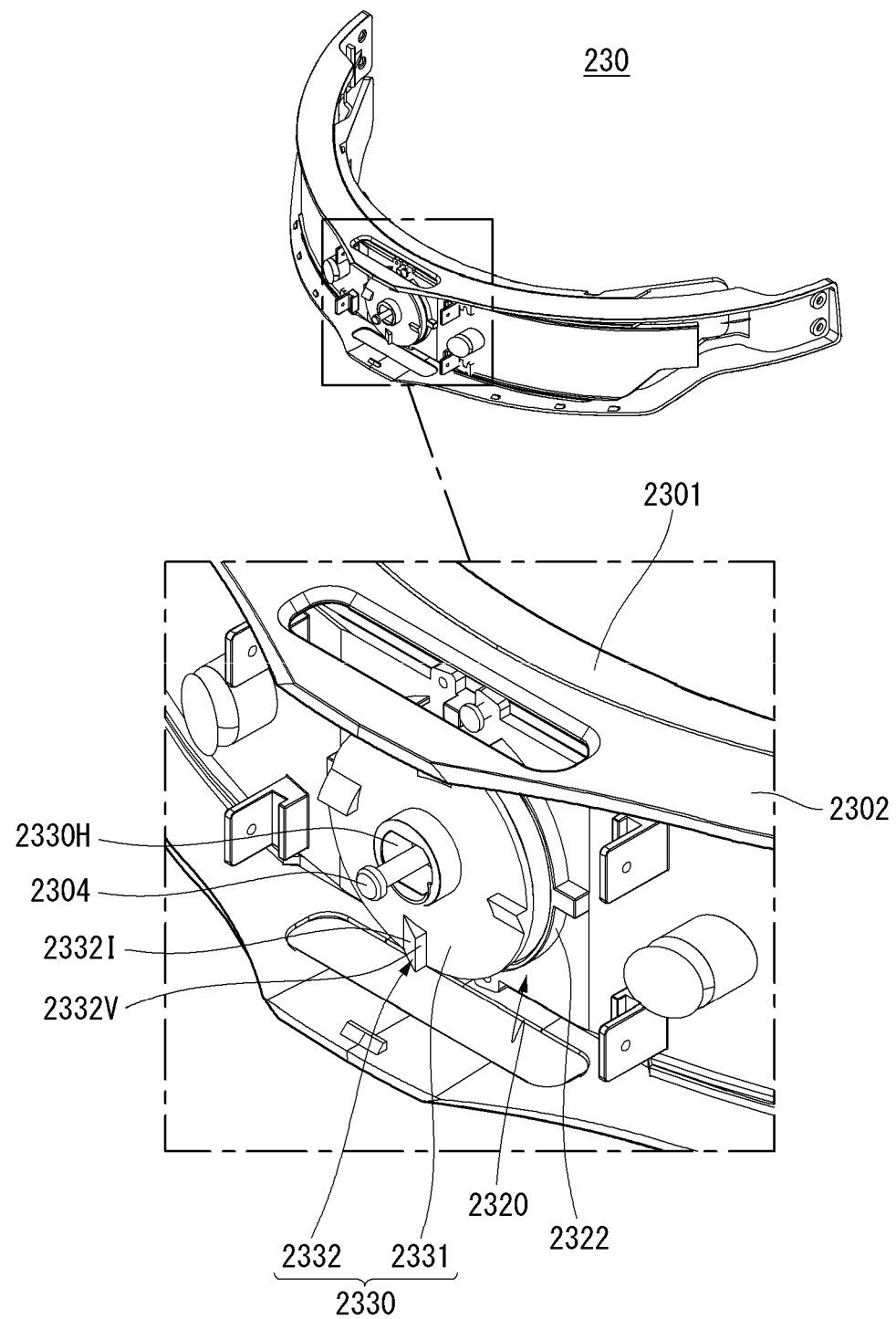

[fig.13]
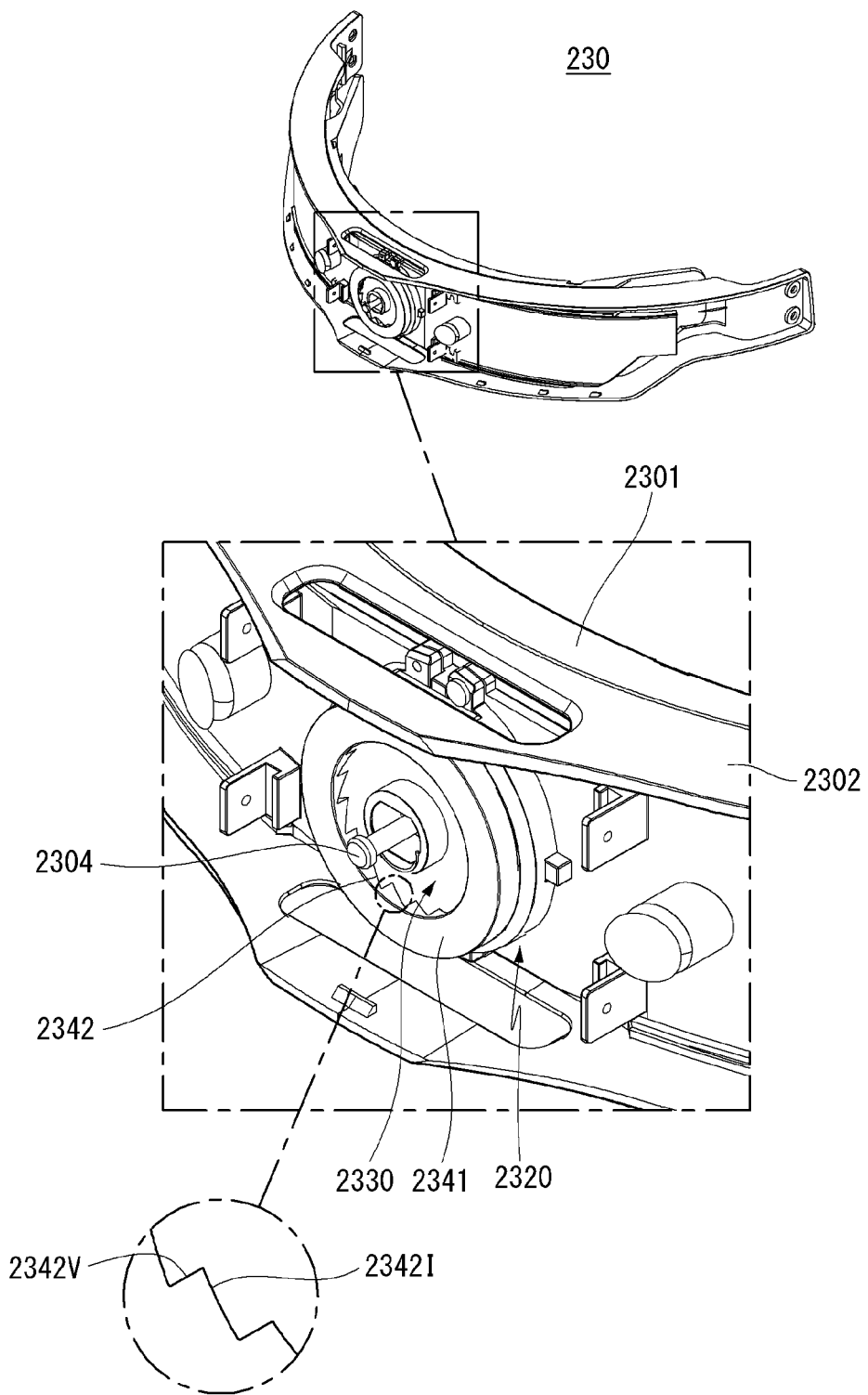

[fig.14]
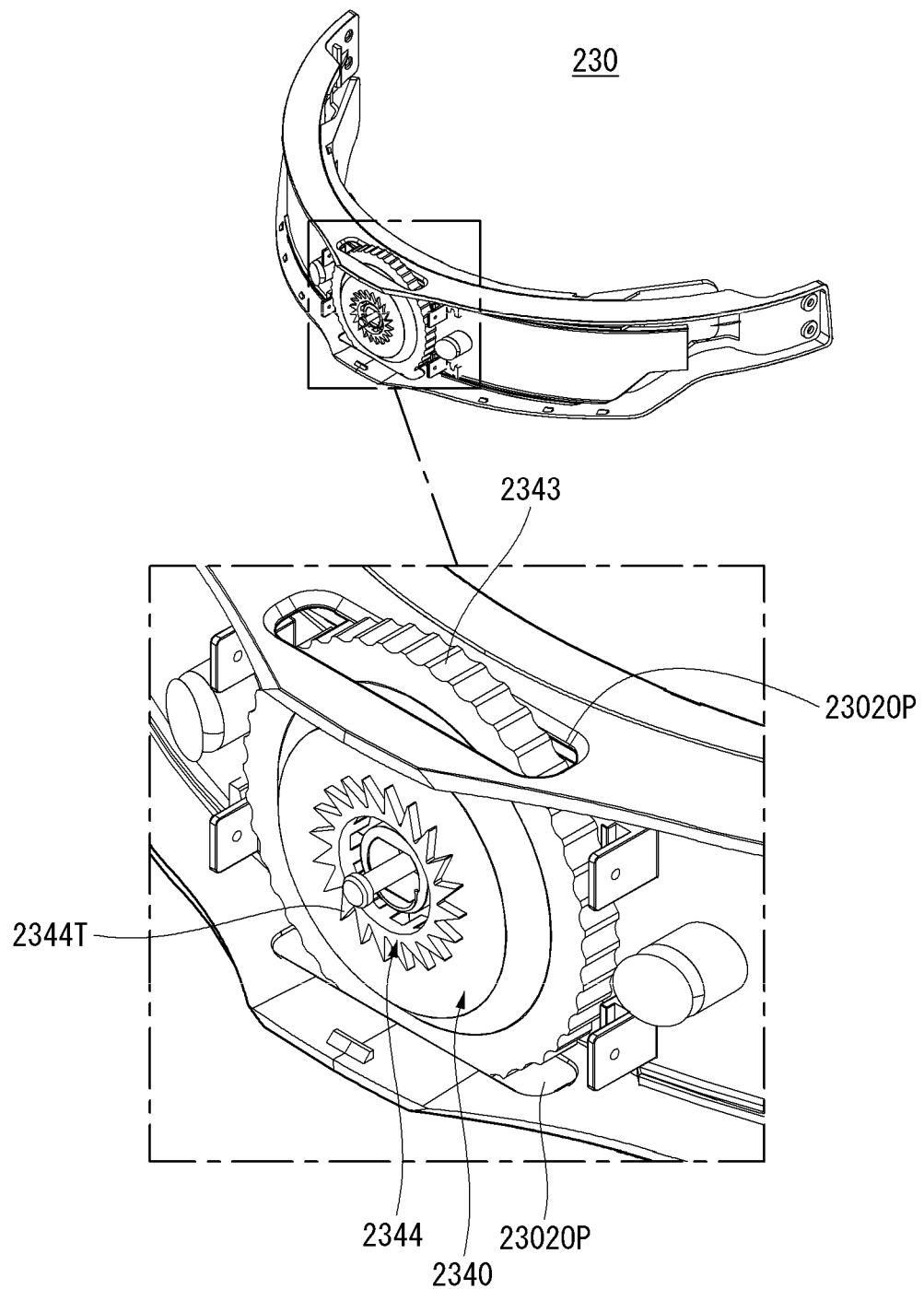

[fig.15]
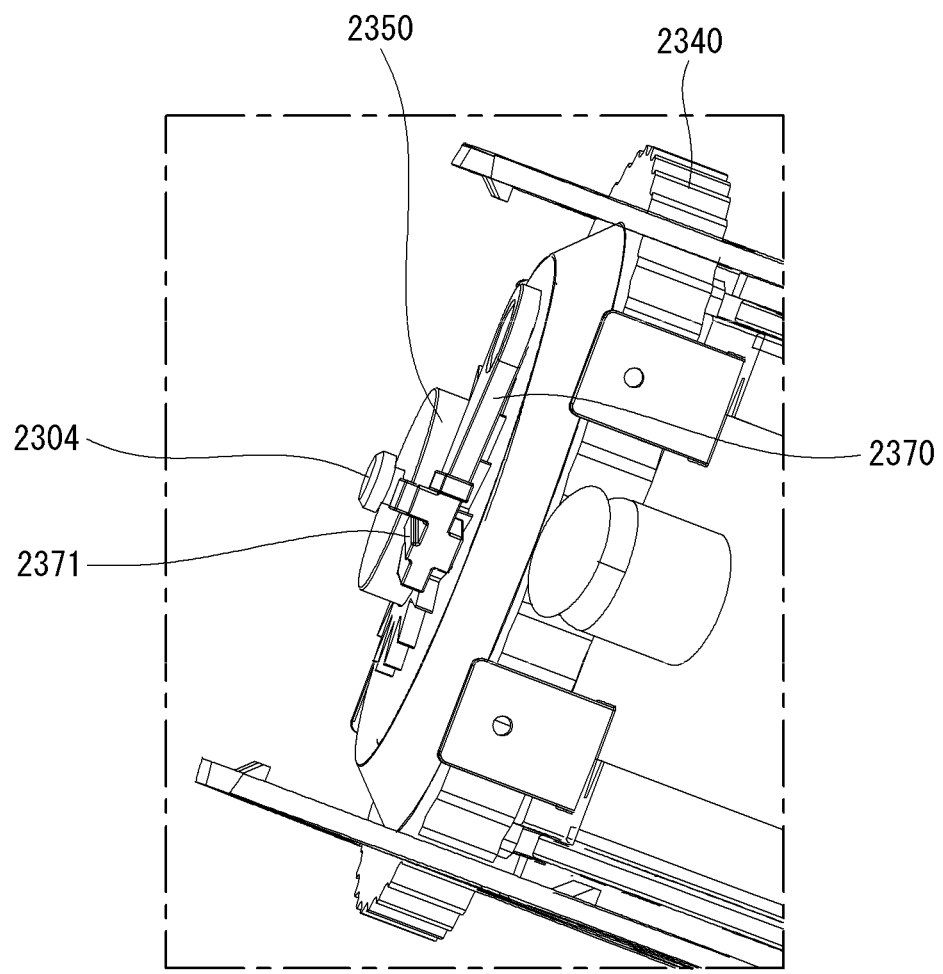

[fig.16]
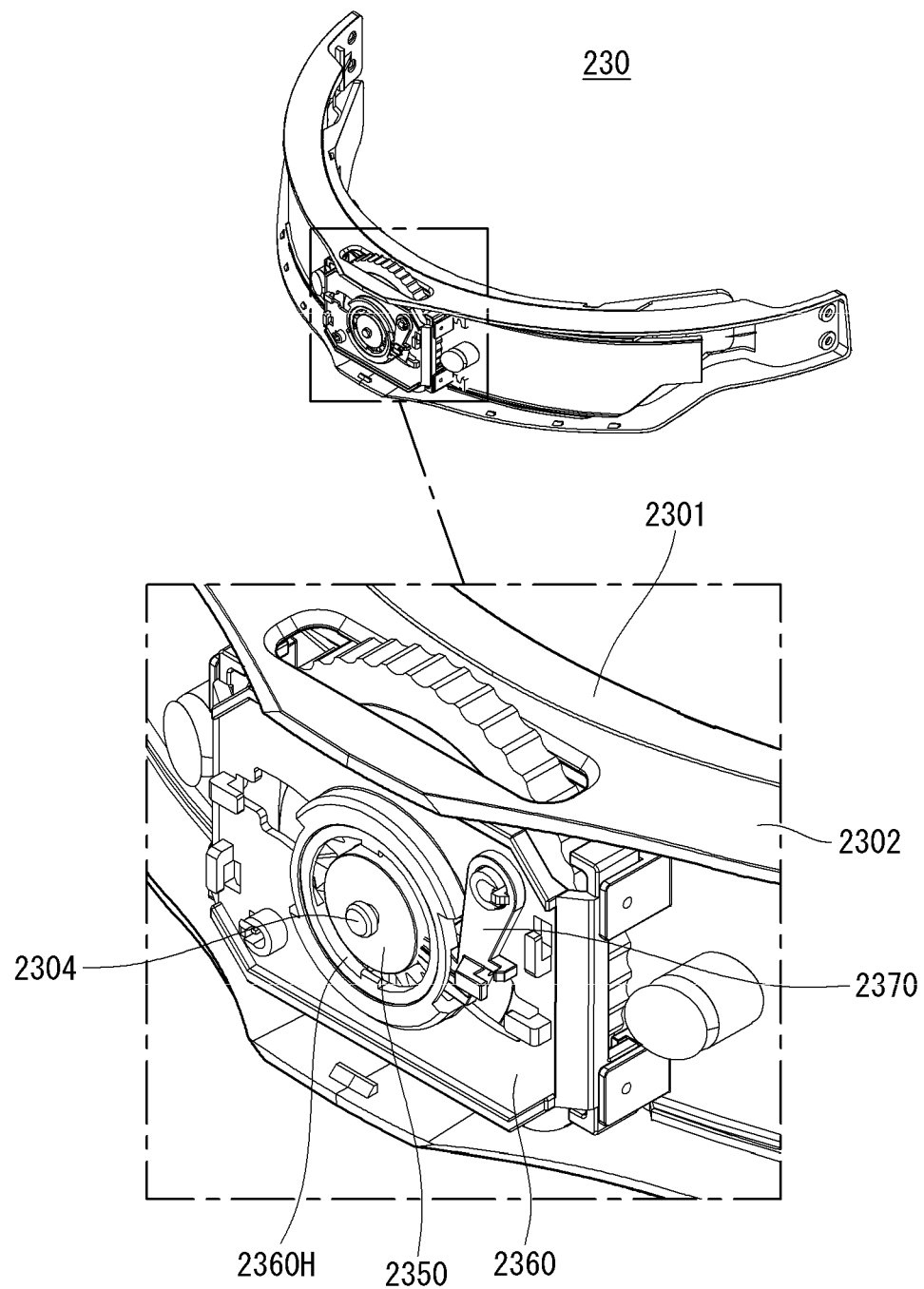

[fig. 17]
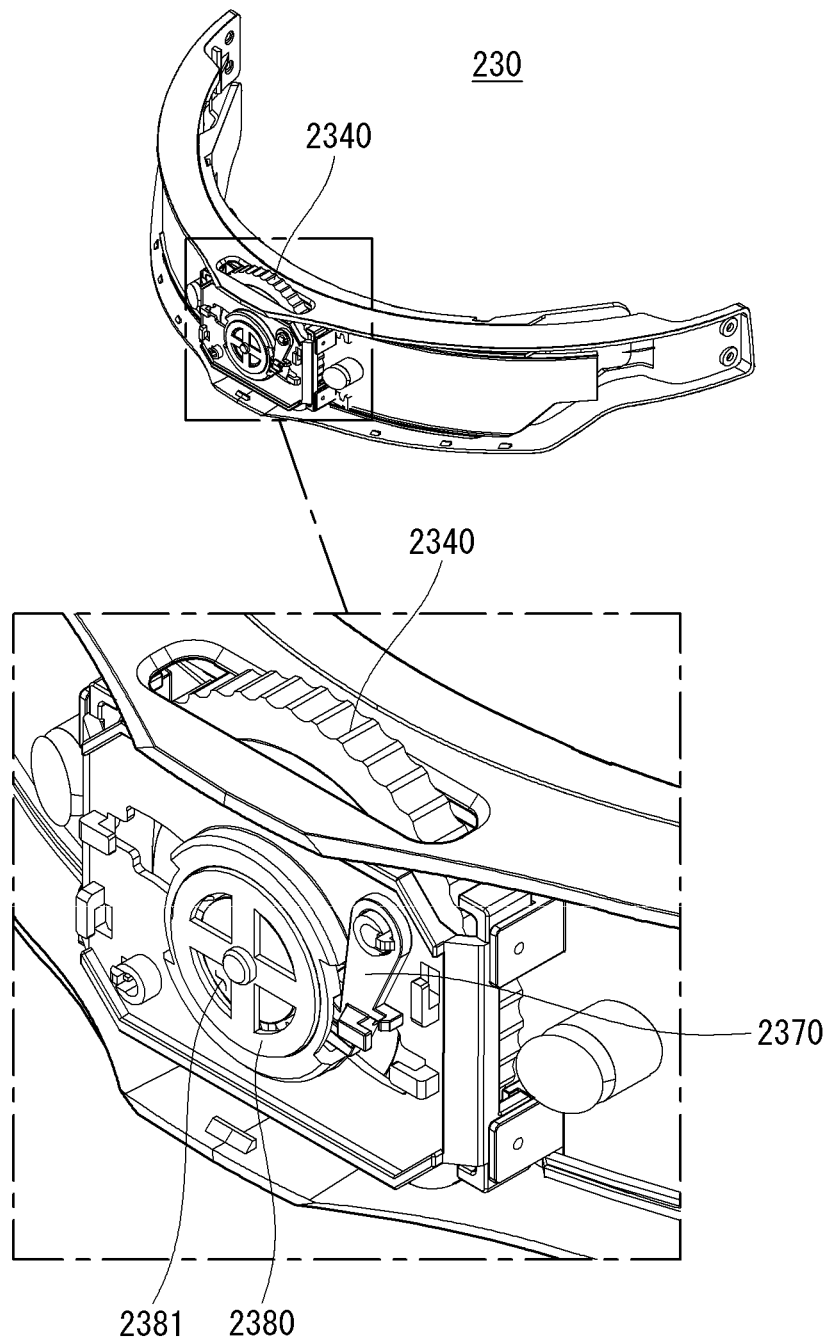

[fig. 18]
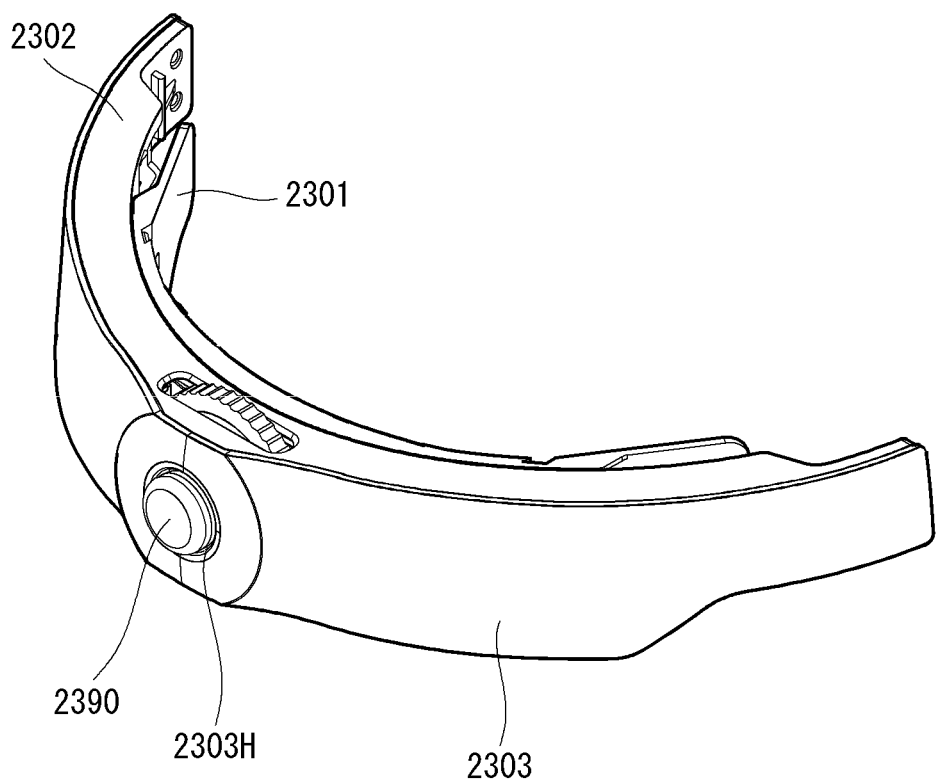

[fig. 19]
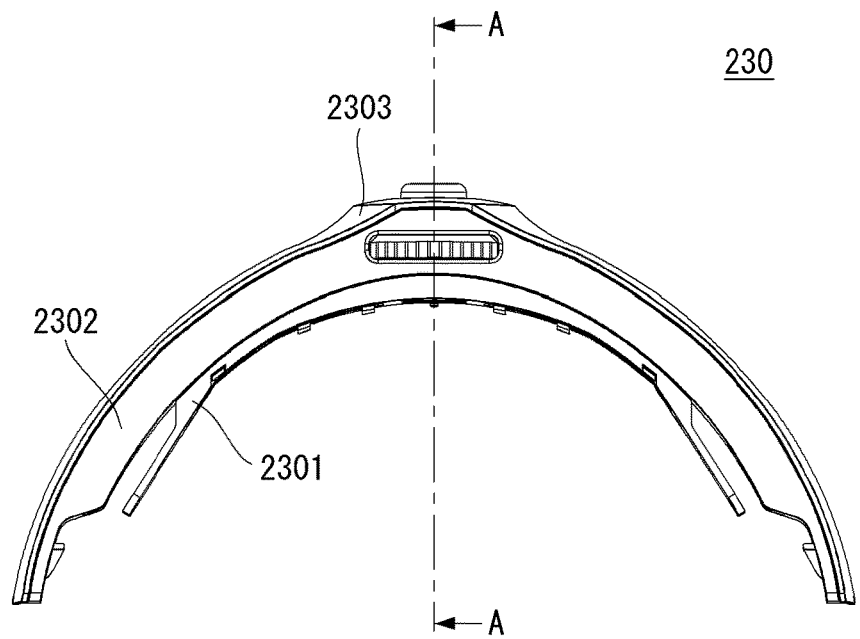
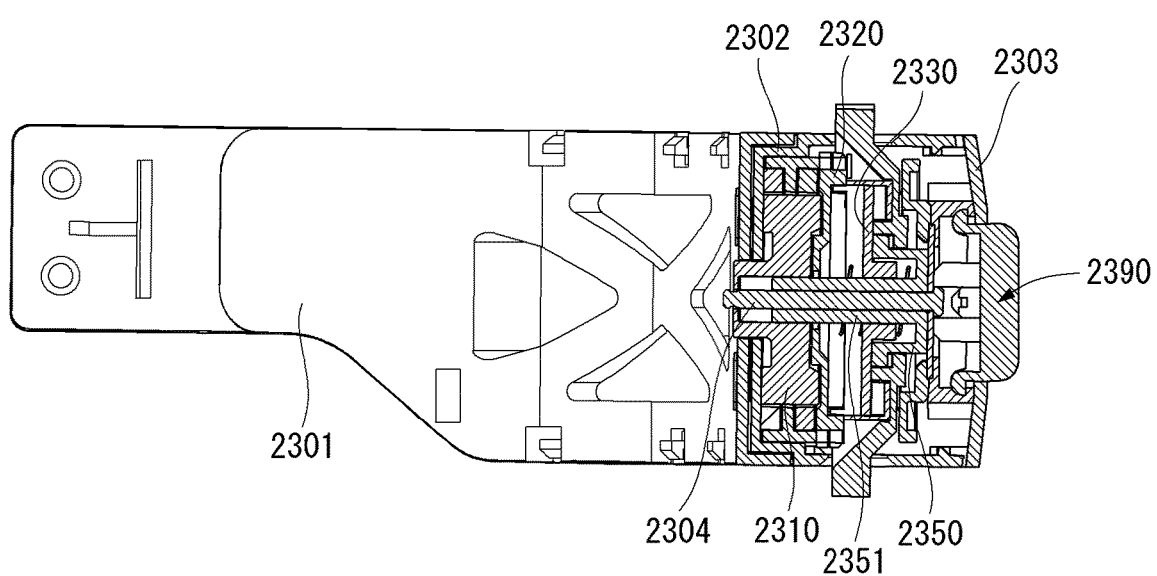

ELECTRONIC DEVICE FOR VR, AR, AND MR

CROSS REFERENCE TO RELATED APPLICATIONS

This application is the National Phase of PCT International Application No. PCT/KR2019/002549, filed on Mar. 5, 2019, all of which is hereby expressly incorporated by reference into the present application.

TECHNICAL FIELD

The disclosure relates to electronic devices. More particularly, the disclosure relates to an electronic device used in virtual reality (VR), augmented reality (AR), or mixed reality (MR).

BACKGROUND ART

Virtual reality (VR) means a particular environment or context that is artificially created using, e.g., a computer and is similar but not real or a technology therefor.

Augmented reality (AR) is technology that allows a virtual object to look present in the original environment by synthesizing the virtual object or information with the actual environment.

Mixed reality (MR) or hybrid reality (HR) refers to creating a new environment or new information by merging the virtual world and the real world. Among others, enabling real-time interactions between things preset in the virtual and real world is called mixed reality.

A created virtual environment or circumstance stimulates the user's five senses and allows her to have a similar spatial and temporal experience to the reality while freely passing the border between the real and virtual worlds. Not simply is the user immersed in such an environment, but the user may also interact with things implemented in the environment by controlling or instructing them on a device.

Recently underway are vigorous research efforts to develop gear used in the technology.

DETAILED DESCRIPTION OF THE DISCLOSURE

Technical Problems

The disclosure aims to address the foregoing and other issues. Another object may be to provide an electronic device that is easy to tighten and loosen.

Still another object may be to provide an electronic device that may be easily worn on the user's head.

Yet still another object may be to enhance the durability of a tightening and loosening dial.

Means to Address the Problems

To achieve the foregoing and other objectives, according to an embodiment of the disclosure, there is provided an electronic device, comprising a goggle frame having at least one opening in a front surface thereof, a display positioned in front of the goggle frame and facing the at least one opening, a front band to which the goggle frame is fixed, a strap having a first end fixed to the front band and a second end having a rack gear, and a rear band coupled to the second end of the strap having the rack gear, wherein the rear band includes a support, a rotatable gear mounted on the support and engaged with the rack gear, a rotor facing the gear and interlocking with the gear, and a dial facing the rotor and at least partially exposed to an outside of the rear band, wherein the rotor includes a rotation body facing the dial, and a coupling protrusion positioned between the rotation body and the dial and protruding from the rotation body, and wherein the dial includes a coupler facing the rotation body and coupling teeth positioned between the rotation body and the coupler, protruding from the coupler, and engaged with the coupling protrusion.

According to another embodiment of the disclosure, the coupling teeth may be successively arranged along a circumference of the rotation body.

According to another embodiment of the disclosure, the rotor may include a plurality of coupling protrusions, and wherein the plurality of coupling protrusions are arranged at intervals along the circumference of the rotation body.

According to another embodiment of the disclosure, the coupling teeth may include a vertical surface extending from the coupler from the dial to the rotation body of the rotor and an inclined surface extending from a top end of the vertical surface to the coupler of the dial.

According to another embodiment of the disclosure, the plurality of coupling protrusions may include a vertical surface extending from the rotation body of the rotor to the coupler of the dial and an inclined surface extending from a top end of the vertical surface to the rotation body of the rotor, and wherein the inclined surface of the coupling teeth may face the inclined surface of the plurality of coupling protrusions.

According to another embodiment of the disclosure, the electronic device may further comprise a base positioned between the gear and the rotor, an elastic member installed between the base and the rotor and providing an elastic force to the rotor, and a button positioned through the dial and pushing the rotor.

According to another embodiment of the disclosure, the button may be spline-coupled with the rotor and the gear.

According to another embodiment of the disclosure, the dial may further include fixing teeth formed on an outer surface of the dial and stretched radially from the dial.

According to another embodiment of the disclosure, the electronic device may further comprise a lever pivotably mounted in the rear band and having an end engaged with the fixing teeth.

According to another embodiment of the disclosure, the fixing teeth may be successively arranged along a circumferential direction of the dial.

Effects of the Disclosure

According to the disclosure, the electronic device provides the following effects.

According to at least one of embodiments of the disclosure, it is possible to provide an electronic device easy to tighten and loosen.

According to at least one of embodiments of the disclosure, it is possible to provide an electronic device that may be easily worn on the user's head.

According to at least one of embodiments of the disclosure, it is possible to enhance the durability of a tightening and loosening dial.

The applicability and additional scope of the disclosure will be apparent from the following detailed description. However, it will be readily appreciated by one of ordinary skill in the art that various changes and modifications may be made thereto without departing from the spirit and scope of the disclosure and, thus, the detailed description and specific embodiments of the disclosure, such as the preferred embodiments, should be understood as provided solely for illustration purposes.

BRIEF DESCRIPTION OF THE DRAWINGS

FIGS. 1 to 19 are views illustrating examples of electronic devices according to embodiments of the disclosure.

MODE TO PRACTICE THE DISCLOSURE

Hereinafter, embodiments of the disclosure are described in detail with reference to the accompanying drawings. The same references may be used to denote the same or similar elements throughout the drawings and the specification, and no duplicate description is given of the elements. As used herein, the terms "module" and "unit" are provided solely for ease of description and these terms may be used interchangeably but rather than being distinct in meaning or role. When determined to make the subject matter of the disclosure unclear, the detailed description of the known art or functions may be skipped. The accompanying drawings are provided merely for a better understanding of the disclosure and the technical spirit or the scope of the disclosure are not limited by the drawings.

Further (refer to FIG. 1), in the following description, the first direction DR1 may be a direction parallel to the length direction of the electronic device 100, and the second direction DR2 may be a direction parallel to the height direction of the electronic device 100. The third direction DR3 may be a direction perpendicular to the first direction DR1 and/or the second direction DR2.

The first direction DR1 and the second direction DR2 may be collectively referred to as a horizontal direction. Further, the third direction DR3 may be referred to as a vertical direction.

When the electronic device 100 is viewed from the front F, it may face a front side of the electronic device 100. When the electronic device 100 is viewed from the rear B, it may face a rear side of the electronic device 100.

When the electronic device 100 is viewed from the rear B, a direction from the left side to the right side of the electronic device 100 or a direction from the right side to the left side may be referred to as a left-right direction LR. A direction from the top side to the bottom side or a direction from the bottom side to the top side of the electronic device 100 may be referred to as an up-down direction UD.

Referring to FIGS. 1 to 3, a front cover 110 may form an outline of an electronic device 100. The front cover 110 may have a tub shape. A window 120 may be mounted or formed on the front surface of the front cover 110. The window 120 may include a light transmissive material. A vent 130 may be mounted or formed on a top surface and/or a bottom surface of the front cover 110. A top vent 131 may have a square shape and may be located on the top surface of the front cover 110. A bottom vent 132 may have an elongated shape and may be located on the bottom surface of the front cover 110.

A manipulation unit 140 may be mounted on a side surface of the front cover 110. The manipulation unit 140 may be a plurality of buttons. Input/output units 142 and 143 may be mounted on a side surface of the front cover 110. For example, an input unit 143 may be a USB terminal, and an output unit 142 may provide audio output.

A face pad 150 may be coupled to the front cover 110 from the rear of the front cover 110. The face pad 150 may provide a comfortable fit to the user's face and block light. For example, the face pad 150 may have a shape corresponding to the contour of the front surface of a person's face and may provide a cushioning feeling.

Referring to FIGS. 4 to 6, the frame 160 may be referred to as a goggle frame 160. The goggle frame 160 may have a tub shape as a whole and may have openings 161 and 162 in the front surface. At least one of the openings 161 and 162 may be formed in the front surface of the goggle frame 160. Lenses 1610 and 1620 may block the openings 161 and 162.

The goggle frame 160 may include a body 163 and a box 164. The body 163 has a tub shape, and the face pad 150 may be mounted or fixed to the rear inner side of the body 163. The openings 161 and 162 may be plural and may be formed in the front surface of the body 163. The positions of the openings 161 and 162 may correspond to the positions of the user's eyes. The box 164 may be positioned in front of the body 163 and may be positioned around the openings 161 and 162. The openings 161 and 162 may be positioned between the body 163 and the box 164. The box 164 may provide a space S. The body 163 may also be referred to as the goggle frame 110.

The front of the box 164 may be open. A display panel 172 may be positioned on the front surface of the box 164 to cover the space S of the box 164. A display module 170 may include the display panel 172 and may be positioned on the front surface of the box 164 to cover the space S of the box 164. For example, the display module 170 may be an LCD module or an OLED module.

The camera module 180 may be mounted or fixed to the front of the display module 170, The window 120 may cover the front of the camera module 180. A battery 190 may be positioned between the display module 170 and the camera module 180. The battery 190 may provide power to the electronic device 100. The battery 190 may be a secondary battery.

Referring to FIG. 7, the electronic device 100 may be coupled to a head gear 200. The headgear 200 may include a front band 210, a top band 220, and a rear band 230. The headgear 200 may surround the user's head and may be fixed to the user's head. The front band 210 may have a shape corresponding to a front portion of the user's head, and may be overall shaped as C. The rear band 230 may have a shape corresponding to a rear portion of the user's head, and may be overall shaped as C. The rear band 230 may be coupled with the front band 210. The top band 220 may have a shape corresponding to a top portion or top front portion of the user's head, and may be overall shaped as C. The top band 220 may be coupled to the front band 210 or may extend integrally from the front band 210.

A front cushion 212 may be mounted on the rear B of the front band 210, and a rear cushion 232 may be mounted on the front F of the rear band 230. The front cushion 212 may face the rear cushion 232. The rear band 230 may get relatively farther or closer to the front band 210. This may be for firmly fixing the headgear 200 to the user's head. The front cushion 212 and the rear cushion 232 may minimize the pressure when the headgear 200 is worn on the user's head, enhancing the user's immersion in VR, AR, or MR.

Referring to FIG. 8, straps 242 and 244 may connect the front band 210 and the rear band 230 to each other. The straps 242 and 244 may be fixed to the front band 210 and may extend from the front band 210 to surround the rear band 230. The straps 242, 244 are movable on the rear band 230. Accordingly, the headgear 200 may be tightened. The straps 242 and 244 may include rack gears 2421 and 2441.

Referring to FIGS. 9 and 19, the rear band 230 may include a body 2302, a rear cover 2303, and a support 2301. The rear cover 2303 may be mounted on the rear of the body 2302, and the support 2301 may be mounted on the front of the body 2302. The rear cover 2303 may face the support 2301 with respect to the body 2302.

The support 2301 may form a rear surface of the rear band 230. The support 2301 may have an elongated and curved shape. The rear cushion 232 (refer to FIG. 8) may be coupled to the support 2301. A fixing pin 2304 may be coupled to the support 2301. The fixing pin 2304 may be fixed to the support 2301 to form a long shaft toward the rear of the rear band 230. To prevent the fixing pin 2304 from escaping off the support 2301, a washer 2305 may be inserted between the fixing pin 2304 and the support 2301.

Referring to FIGS. 10 and 19, the body 2302 may have a receiving space therein toward the rear. A gear 2310 may be placed on the receiving space of the body 2302 and may be fitted over the fixing pin 2304. The gear 2310 may rotate on the body 2302 and may be engaged with rack gears 2421 and 2441 of the straps 242 and 244 (refer to FIG. 8). The gear 2310 may include a spline hole 2310H.

Referring to FIGS. 11, 12, and 19, a base 2320 may be positioned on the body 2302 and the gear 2310. The base 2320 may be coupled to the body 2302. The base 2320 may include a support 2321 and a guide wall 2322. The support 2321 may have a low coefficient of friction. A rotor 2330 may rotate on the support 2321 of the base 2320, and the guide wall 2322 may limit the position of the rotor 2330 for stable rotation of the rotor 2330.

The rotor 2330 may be fitted over the fixing pin 2304. The rotor 2304 may include a rotation body 2331 and a coupling protrusion 2332. The rotation body 2331 may have a disk shape. An elastic member SP may provide an elastic force to the rotor 2330. There may be a plurality of coupling protrusions 2332. The plurality of coupling protrusions 2332 may be formed on a plane of the rotation body 2331. The coupling protrusion 2332 may have an inclined surface 2332I and a vertical surface 2332V. The vertical surface 2332V may be parallel to the radial direction of the rotor 2330. The inclined surface 2332I may form an inclination from the top end of the vertical surface 2332V in the rotational direction of the rotor 2330 or its opposite direction. The rotor 2330 may include a spline hole 2330H.

Referring to FIGS. 13, 14, and 19, a dial 2340 may be engaged with the rotor 2330. A coupler 2341 may be formed on a surface of the dial 2340 facing the rotor 2330. The coupler 2341 may include coupling teeth 2342 that engage with the coupling protrusion 2332 of the rotor 2330. The coupling teeth 2342 may have a shape complementary to the coupling protrusion 2332 of the rotor 2330. For example, the coupling teeth 2342 may have a coupling inclined surface 2342I in contact with the inclined surface 2332I of the coupling protrusion 2332 of the rotor 2330 and a coupling vertical surface 2332V facing the vertical surface 2332V of the coupling protrusion 2332 of the rotor 2330. In this case, the coupling teeth 2342 may be formed successively.

Accordingly, durability of coupling between the rotor 2330 and the coupler 2341 may be enhanced.

The body 2302 may have a dial opening 2302OP. The dial 2340 may protrude out of the rear band 230 through the opening 2302OP. The user may easily rotate the dial 2340 from the outside of the rear band 230.

The dial 2340 may have a fixing protrusion 2344 on a surface opposite to the coupler 2341, The fixing protrusion 2344 may include fixing teeth 2344T spread in the radial direction of the dial 2340. The fixing teeth 2344T may be continuously formed.

Referring to FIGS. 10 to 15, the button 2350 may have a spline shaft 2351, The spline shaft 2351 may have a shape complementary to the spline hole 2330H of the rotor 2330 and the spline hole 2310H of the gear 2310. The spline shaft 2351 may be fixedly inserted into the spline hole 2330H of the rotor 2330 and the spline hole 2310H of the gear 2310. Accordingly, if the dial 2340 is engaged with the rotor 2330 and rotates, the gear 2310 may rotate together. The spline holes 2330H and 2310H may be referred to as bosses 2330H and 2310H.

Referring to FIGS. 15 to 17 and 19, a support cover 2360 may be coupled to the body 2302 while covering the dial 2340. The support cover 2360 may have an opening 2360H to expose the button 2350. A lever 2370 may be mounted on the support cover 2360. The lever 2370 may pivot, and a fixing part 2371 may engage with the fixing teeth 2344T of the dial 2340. A cross cap 2380 may cover the opening 2360H of the support cover 2360.

Referring to FIGS. 17 to 19, a cap 2390 may be placed on the cross cap 2380 and may be exposed to the outside through the opening 2303H of the rear cover 2303. If the cap 2390 is pressed, the button 2350 is pressed through the openings 2381 of the cross cap 2380, and the rotation body 2330 engaged with the coupler 2341 of the dial 2340 is pressed so that the coupler 2341 of the dial 2340 and the rotation body 2330 may be released. The gear 2310 may loosen the rack gears 2421 and 2441. Accordingly, the user may easily release the tightening of the rear band 230 and the front band 210 (refer to FIG. 7).

Some of the above-described embodiments are interpreted as excluding or distinguishing from the embodiments. Certain embodiments or other embodiments of the disclosure described above are not mutually exclusive or distinct from each other. Any or all elements of the embodiments of the disclosure described above may be combined or combined with each other in configuration or function).

For example, component A described in connection with a particular embodiment and the drawings may be combined or merged with component B described in connection with another embodiment and the drawings. For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible).

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An electronic device, comprising:
    a goggle frame having at least one opening in a front surface thereof;

a display positioned in front of the goggle frame and facing the at least one opening;

a front band to which the goggle frame is fixed;

a strap having a first end fixed to the front band and a second end having a rack gear; and a rear band coupled to the second end of the strap having the rack gear, wherein the rear band includes:

a support;

a rotatable gear mounted on the support and engaged with the rack gear;

a rotor facing the rotatable gear and interlocking with the rotatable gear; and a dial facing the rotor and at least partially exposed to an outside of the rear band, wherein the rotor includes:

a rotation body facing the dial; and a coupling protrusion positioned between the rotation body and the dial and protruding in an axial direction from the rotation body, and wherein the dial includes:

a coupler facing the rotation body; and coupling teeth positioned between the rotation body and the coupler, protruding in the axial direction from the coupler, and engaged with the coupling protrusion.

2. The electronic device of claim 1, wherein the coupling teeth are successively arranged along a circumference of the rotation body.

3. The electronic device of claim 2, wherein the rotor includes a plurality of coupling protrusions, and wherein the plurality of coupling protrusions are arranged at intervals along the circumference of the rotation body.

4. The electronic device of claim 3, wherein the coupling teeth include:

a vertical surface extending from the coupler from the dial to the rotation body of the rotor; and an inclined surface extending from a top end of the vertical surface to the coupler of the dial.

5. The electronic device of claim 4, wherein the plurality of coupling protrusions include:

a vertical surface extending from the rotation body of the rotor to the coupler of the dial; and an inclined surface extending from a top end of the vertical surface to the rotation body of the rotor, and wherein the inclined surface of the coupling teeth faces the inclined surface of the plurality of coupling protrusions.

6. The electronic device of claim 1, further comprising:

a base positioned between the rotatable gear and the rotor;

an elastic member installed between the base and the rotor and providing an elastic force to the rotor; and a button positioned through the dial and pushing the rotor.

7. The electronic device of claim 6, wherein the button is spline-coupled with the rotor and the rotatable gear.

8. The electronic device of claim 1, wherein the dial further includes fixing teeth formed on an outer surface of the dial and stretched radially from the dial.

9. The electronic device of claim 8, further comprising a lever pivotably mounted in the rear band and having an end engaged with the fixing teeth.

10. The electronic device of claim 8, wherein the fixing teeth are successively arranged along a circumferential direction of the dial.

11. The electronic device of claim 1, wherein the rotor is between the rotatable gear and the dial in the axial direction.

\* \* \* \* \*